United States Patent
Peleg (10) Patent No.: US 12,131,458 B2
(45) Date of Patent: *Oct. 29, 2024

(54) DETERMINATION OF A SIMULATED IMAGE OF A SPECIMEN

(71) Applicant: Applied Materials Israel Ltd., Rehovot (IL)

(72) Inventor: Irad Peleg, Tel Aviv (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,324

(22) Filed: Dec. 6, 2022

(65) Prior Publication Data

US 2023/0096362 A1 Mar. 30, 2023

Related U.S. Application Data (63) Continuation of application No. 17/011,949, filed on Sep. 3, 2020, now Pat. No. 11,562,476.

(51) Int. Cl.
*G06T 7/00* (2017.01)
*G06N 20/00* (2019.01)

(52) U.S. Cl.
CPC ........... *G06T 7/0006* (2013.01); *G06N 20/00* (2019.01); *G06T 7/001* (2013.01); *G06T 2207/20081* (2013.01); *G06T 2207/30148* (2013.01)

(58) Field of Classification Search
CPC ....... G06T 11/005; G06T 7/248; G06T 5/005; G06T 5/50; G06T 7/001; G06T 7/0006; G01R 33/481; G06N 20/00; A63B 24/0006; B25J 9/163; B25J 9/1612; H04S 7/304; H04N 7/15; G06K 9/6217
See application file for complete search history.

(56) References Cited

U.S. PATENT DOCUMENTS

| | | | |
|---|---|---|---|
| 2020/0090383 A1 | 3/2020 | Dwivedi | |
| 2020/0294289 A1 | 9/2020 | Entezari | |
| 2020/0380662 A1* | 12/2020 | Cohen | G06T 7/0004 |

OTHER PUBLICATIONS

Gatys, Leon A., et al. "Texture synthesis using convolutional neural networks." arXiv preprint arXiv:1505.07376, Nov. 6, 2015, 10 pages.

(Continued)

*Primary Examiner* — Phuoc H Doan
(74) *Attorney, Agent, or Firm* — Lowenstein Sandler LLP (57) ABSTRACT

There is provided a system to examine a semiconductor specimen, the system comprising a processor and memory circuitry configured to obtain a training sample comprising an image of a semiconductor specimen and a design image based on design data, train a machine learning module, wherein the training includes minimizing a function representative of a difference between a simulated image generated by the machine learning module based on a given design image, and a corrected image corresponding to a given image after correction of pixel position of the given image in accordance with a given displacement matrix, wherein the minimizing includes optimizing parameters of the machine learning module and of the given displacement matrix, wherein the trained machine learning module is usable to generate a simulated image of a specimen based on a design image of the specimen.

20 Claims, 7 Drawing Sheets

(56) References Cited

OTHER PUBLICATIONS

Hur, Junhwa et al. "Iterative residual refinement for joint optical flow and occlusion estimation." arXiv:1904.05290v1 [cs.CV], Proceedings of the IEEE/CVF Conference on Computer Vision and Pattern Recognition, Apr. 10, 2019; 15 pages.

Schlegl, Thomas, et al. "Unsupervised anomaly detection with generative adversarial networks to guide marker discovery." arXiv:1703.05921v1 [cs.CV]; International conference on information processing in medical imaging. Springer, Cham, Mar. 17, 2017; 12 pages.

\* cited by examiner

| $(290_{1,1};291_{1,1})$ | ... | ... | ... | $(290_{1,N};291_{1,N})$ |
|---|---|---|---|---|
| ... | ... | ... | ... | ... |
| ... | ... | ... | ... | ... |
| ... | ... | ... | ... | ... |
| $(290_{N,1};291_{N,1})$ | ... | ... | ... | $(290_{N,N};291_{N,N})$ |

DETERMINATION OF A SIMULATED IMAGE OF A SPECIMEN

RELATED APPLICATIONS

This application is a continuation application of co-pending U.S. patent application Ser. No. 17/011,949, filed Sep. 3, 2020, which is incorporated herein by reference.

TECHNICAL FIELD

The presently disclosed subject matter relates, in general, to the field of examination of a specimen, and more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various stages during semiconductor fabrication to detect and classify defects on specimens. Effectiveness of examination can be increased by automatization of process(es) as, for example, Automatic Defect Classification (ADC), Automatic Defect Review (ADR), etc.

GENERAL DESCRIPTION

In accordance with certain aspects of the presently disclosed subject matter, there is provided a system to examine a semiconductor specimen, the system comprising a processor and memory circuitry (PMC) configured to obtain a plurality of training samples, each training sample comprising an image of a semiconductor specimen and a design image based on design data, train a machine learning module based on a given training sample comprising a given image and a given design image, wherein a given displacement matrix is initialized for the given image, wherein the training includes minimizing a function representative of a difference between a simulated image generated by the machine learning module based on the given design image, and a corrected image corresponding to the given image after correction of pixel position of the given image in accordance with the given displacement matrix, wherein the minimizing includes optimizing parameters of the machine learning module and of the given displacement matrix, wherein the machine learning module is usable, after the training, to generate a simulated image of a semiconductor specimen based on a design image of the semiconductor specimen.

According to some embodiments, the given displacement matrix is informative of displacement fields to be applied to pixels of the given image.

According to some embodiments, the corrected image includes structural elements with less process variation than structural elements of the given image.

According to some embodiments, the function comprises a smoothing term influencing optimization of parameters of the given displacement matrix.

According to some embodiments, the simulated image corresponds to an estimation of the given image without defects present in the image, or to an estimation of the given image with less defects.

According to some embodiments, the system is configured to feed a design image of a specimen generated based on design data to the machine learning module after its training and generate a simulated image of the specimen.

According to some embodiments, the system is configured to obtain a first image of a semiconductor specimen and a first design image based on design data, wherein a first displacement matrix is initialized for the first image, minimize a function representative of a difference between a simulated image generated by the machine learning module based on the first design image, and a corrected image corresponding to the first image after correction of pixel position of the first image in accordance with the first displacement matrix, wherein the minimizing includes optimizing parameters of the first displacement matrix, and output the corrected image.

In accordance with other aspects of the presently disclosed subject matter, there is provided a method of examining a semiconductor specimen, the method comprising, by a processor and memory circuitry (PMC) obtaining a plurality of training samples, each training sample comprising an image of a semiconductor specimen and a design image based on design data, training a machine learning module based on a given training sample comprising a given image and a given design image, wherein a given displacement matrix is initialized for the given image, wherein the training includes minimizing a function representative of a difference between a simulated image generated by the machine learning module based on the given design image, and a corrected image corresponding to the given image after correction of pixel position of the given image in accordance with the given displacement matrix, wherein the minimizing includes optimizing parameters of the machine learning module and of the given displacement matrix, wherein the machine learning module is usable, after the training, to generate a simulated image of a specimen based on a design image of the specimen.

According to some embodiments, the given displacement matrix is informative of displacement fields to be applied to pixels of the given image.

According to some embodiments, the corrected image includes structural elements with less process variation than structural elements of the given image.

According to some embodiments, the function comprises a smoothing term influencing optimization of parameters of the given displacement matrix.

According to some embodiments, the simulated image corresponds to an estimation of the given image without defects present in the given image, or to an estimation of the given image with less defects.

According to some embodiments, the method comprises feeding a design image of a specimen generated based on design data to the machine learning module after its training and generating a simulated image of the specimen.

According to some embodiments, the method comprises obtaining a first image of a semiconductor specimen and a first design image based on design data, wherein a first displacement matrix is initialized for the first image, minimizing a function representative of a difference between a simulated image generated by the machine learning module based on the first design image, and a corrected image corresponding to the first image after correction of pixel position of the first image in accordance with the first displacement matrix, wherein the minimizing includes optimizing parameters of the first displacement matrix, and outputting the corrected image.

In accordance with other aspects of the presently disclosed subject matter, there is a non-transitory computer readable medium comprising instructions that, when executed by a PMC, cause the PMC to perform operations as described above.

According to some embodiments, the proposed solution allows efficient and precise generation of a simulated image of a semiconductor specimen based on a design image of a semiconductor specimen generated based on design data. In particular, the simulated image is similar to an image of the specimen, but without (or with less) noise and/or defects. According to some embodiments, the proposed solution allows efficient generation of a corrected image based on an image of a specimen, in which process variations are reduced or cancelled.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "training", "obtaining", "minimizing", "determining", "optimizing", "outputting", "generating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system 103 and respective parts thereof disclosed in the present application.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination", or its derivatives used in this specification, is not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase, at least some of the suspected locations are more thoroughly analyzed with relatively high resolution. In some cases, both phases can be implemented by the same inspection tool, and, in some other cases, these two phases are implemented by different inspection tools.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.).

Design data can be provided in different formats such as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
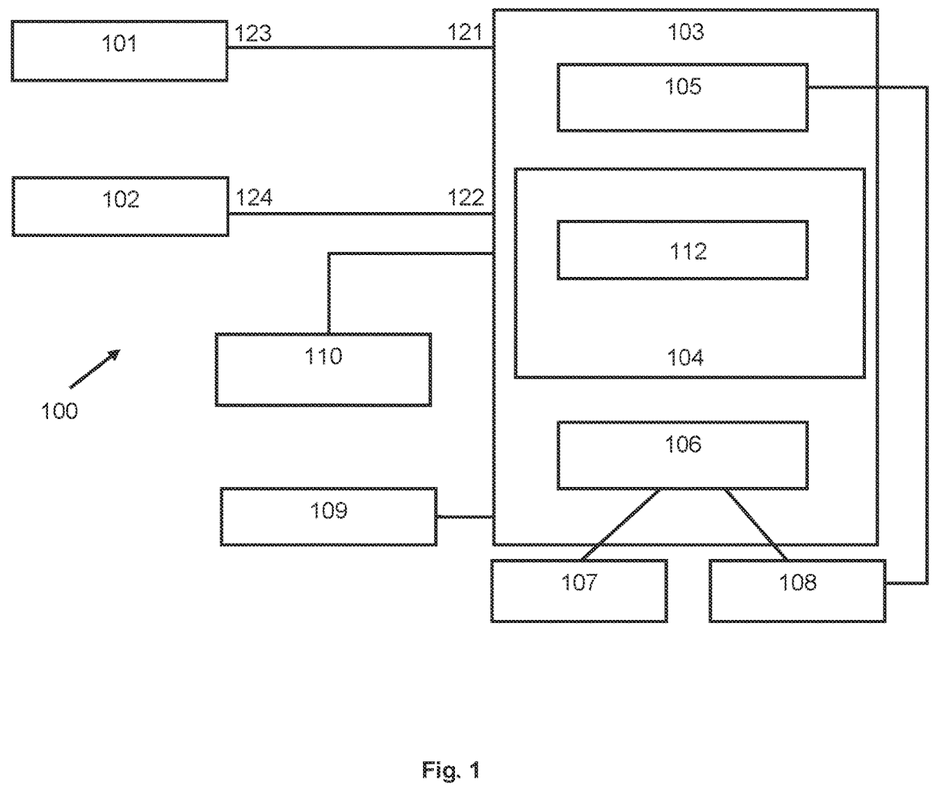
FIG. 1 illustrates a generalized block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. of a wafer and/or parts thereof) as part of the specimen fabrication process. The illustrated examination system 100 comprises computer-based system 103 capable of automatically determining metrology-related and/or defect-related information using images obtained during specimen fabrication. System 103 can be operatively connected to one or more low-resolution examination tools 101 and/or one or more high-resolution examination tools 102 and/or other examination tools. The examination tools are configured to capture images and/or to review the captured image(s) and/or to enable or provide measurements related to the captured image(s). System 103 can be further operatively connected to CAD server 110 and data repository 109.

System 103 includes a processor and memory circuitry (PMC) 104 operatively connected to a hardware-based input interface 105 and to a hardware-based output interface 106. PMC 104 is configured to provide all processing necessary for operating the system 103 as further detailed hereinafter (see methods described in FIGS. 3 to 5, which can be performed at least partially by system 103) and includes a processor (not shown separately) and a memory (not shown separately). The processor of PMC 104 can be configured to execute several functional modules in accordance with computer-readable instructions implemented on a non-transitory computer-readable memory comprised in the PMC. Such functional modules are referred to hereinafter as comprised in the PMC. Functional modules comprised in PMC 104 include a deep neural network (DNN) 112. DNN 112 is configured to enable data processing using a machine learning algorithm for outputting application-related data based on the images of specimens.

By way of non-limiting example, the layers of DNN 112 can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized in a plurality of DNN sub-networks. Each layer of the DNN can include multiple basic computational elements (CE), typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of DNN 112 can be initially selected prior to training, and can be further iteratively adjusted or modified during training to achieve an optimal set of weighting and/or threshold values in a trained DNN. After each iteration, a difference (also called loss function) can be determined between the actual output produced by DNN 112 and the target output associated with the respective training set of data. The difference can be referred to as an error value. Training can be determined to be complete when a cost or loss function indicative of the error value is less than a predetermined value, or when a limited change in performance between iterations is achieved. Optionally, at least some of the DNN subnetworks (if any) can be trained separately, prior to training the entire DNN.

System 103 is configured to receive, via input interface 105, input data. Input data can include data (and/or derivatives thereof and/or metadata associated therewith) produced by the examination tools and/or data produced and/or stored in one or more data repositories 109 and/or in CAD server 110 and/or another relevant data depository. It is noted that input data can include images (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen.

System 103 is further configured to process at least part of the received input data and send, via output interface 106, the results (or part thereof) to a storage system 107, to examination tool(s), to a computer-based graphical user interface (GUI) 108 for rendering the results and/or to external systems (e.g. Yield Management System (YMS) of a FAB). GUI 108 can be further configured to enable user-specified inputs related to operating system 103.

By way of non-limiting example, a specimen can be examined by one or more low-resolution examination machines 101 (e.g. an optical inspection system, low-resolution SEM, etc.). The resulting data (referred to hereinafter as low-resolution image data 121), informative of low-resolution images of the specimen, can be transmitted—directly or via one or more intermediate systems—to system 103. Alternatively or additionally, the specimen can be examined by a high-resolution machine 102 (e.g. a subset of potential defect locations selected for review can be reviewed by a scanning electron microscope (SEM) or Atomic Force Microscopy (AFM)). The resulting data (referred to hereinafter as high-resolution image data 122)

informative of high-resolution images of the specimen, can be transmitted—directly, or via one or more intermediate systems—to system 103.

It is noted that images of a desired location on a specimen can be captured at different resolutions. By way of non-limiting example, so-called "defect images" of the desired location are usable to distinguish between a defect and a false alarm, while so-called "class images" of the desired location are obtained with higher resolution and are usable for defect classification. In some embodiments, images of the same location (with the same or different resolutions) can comprise several images registered therebetween (e.g. images captured from the given location and one or more design images corresponding to the given location).

It is noted that image data can be received and processed together with metadata (e.g. pixel size, text description of defect type, parameters of image capturing process, etc.) associated therewith.

Upon processing the input data (e.g. low-resolution image data and/or high-resolution image data, optionally together with other data as, for example, design data, synthetic data, etc.), system 103 can send the results (e.g. instruction-related data 123 and/or 124) to any of the examination tool(s), store the results (e.g. defect attributes, defect classification, etc.) in storage system 107, render the results via GUI 108 and/or send to an external system (e.g. to YMS).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some examination tools 101 and/or 102, data repositories 109, storage system 107 and/or GUI 108 can be external to the examination system 100 and operate in data communication with system 103 via input interface 105 and output interface 106. System 103 can be implemented as stand-alone computer(s) to be used in conjunction with the examination tools. Alternatively, the respective functions of the system can, at least partly, be integrated with one or more examination tools.

Figure 2:
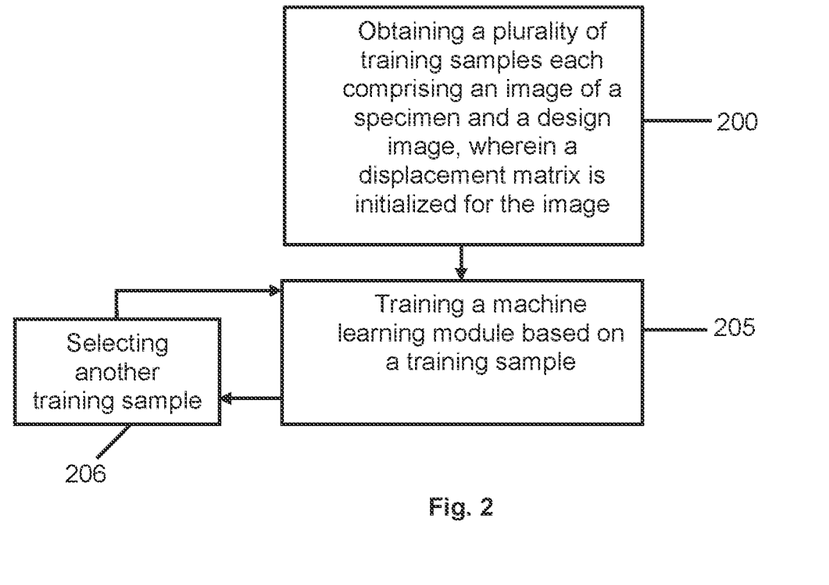
FIG. 2 illustrates a generalized flow-chart of a method of training a machine learning module to generate a simulated image based on a design image based on design data.
Figure 2A:
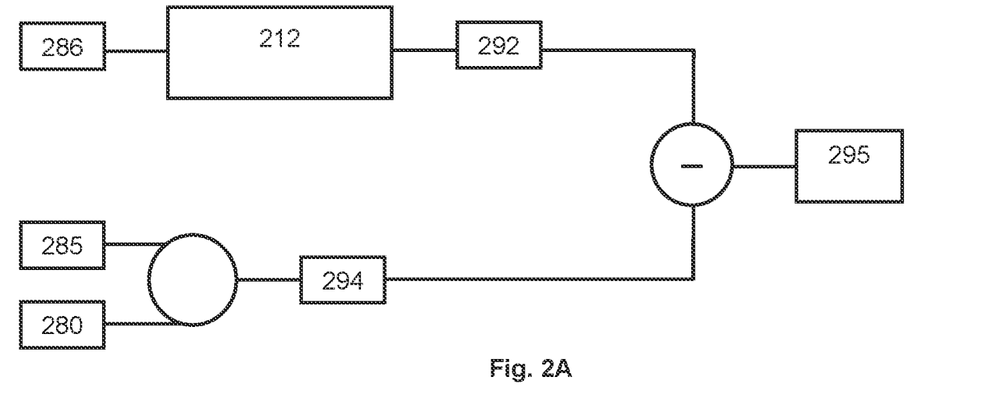
FIG. 2A illustrates an architecture that can be used to train the machine learning module.

Attention is now drawn to FIGS. 2 and 2A.

The proposed method includes obtaining (operation 200) a plurality of training samples. A training sample includes an image 280 of a semiconductor specimen. As shown in the non-limiting example of FIG. 2B, image 280 includes a plurality of first structural elements 281. Structural elements include (examples which are provided are not limitative) gates, transistors, contacts, or parts of these elements. The nature and/or the shape of the structural elements can be different in the image.

Figure 2B:
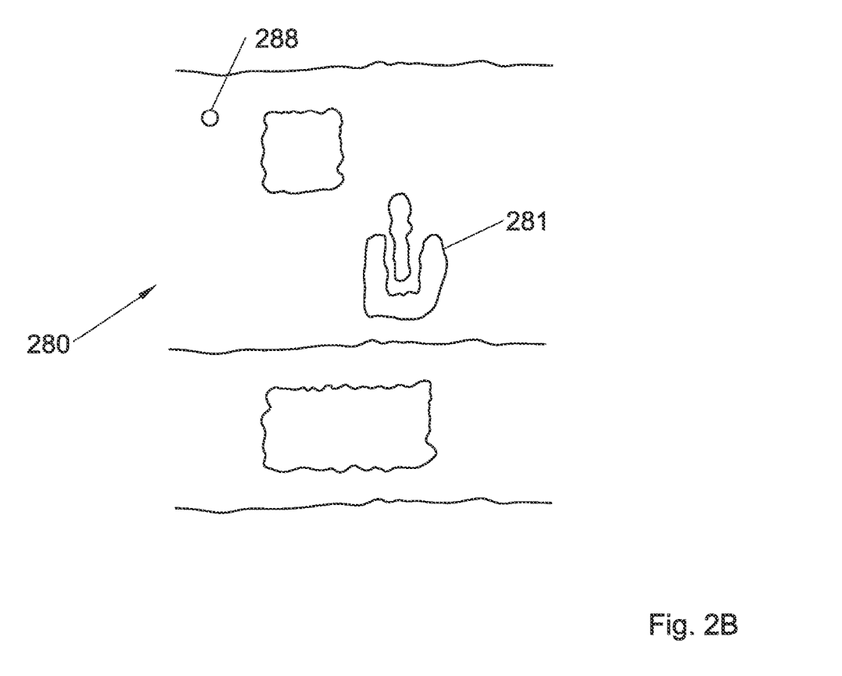
FIG. 2B illustrates a non-limitative example of an image of a specimen.

According to some embodiments, image 280 has been acquired by an electron beam examination tool (see e.g. reference 102 above) such as a scanning electron microscope (SEM), or an Atomic Force Microscope (AFM). According to other embodiments, image 280 has been acquired by an optical examination tool (see e.g. reference 101 above). This is, however, not limitative.

Figure 2C:
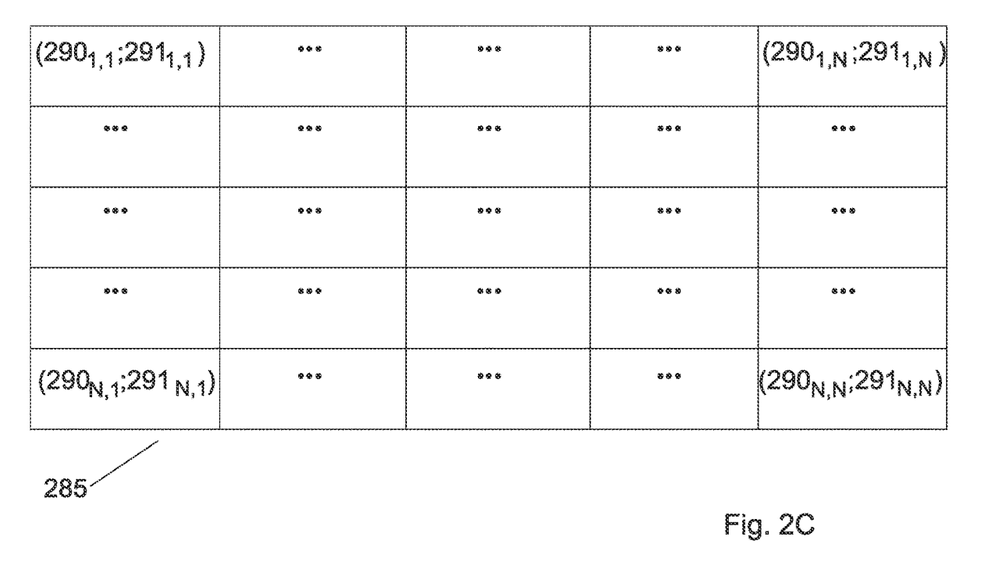
FIG. 2C illustrates a non-limitative example of a displacement matrix associated with the image.

A displacement matrix 285 is initialized for the image 280 (in other words, a displacement matrix 285 with initial parameters is set—as explained hereinafter, these initial parameters are then optimized during a training process). Before the beginning of the training based on the training sample, the displacement matrix 285 can include e.g. arbitrary values (which can be e.g. predefined and/or can set by an operator). For example, the displacement matrix 285 can correspond to a null matrix. This is, however, not limitative. As explained hereinafter, the displacement matrix 285 is usable to reduce or cancel process variation present in structural elements 281 of the image 280. Process variation corresponds e.g. to the naturally occurring variation in the attributes of transistors (e.g. length, widths, oxide thickness) when integrated circuits are fabricated. The displacement matrix 285 includes e.g. a matrix storing a plurality of displacement fields. Each given displacement field is associated with a given pixel or a given group of pixels of the image 280 and is informative of a displacement (in a two dimensional referential, e.g. of the image 280) to be applied to the given pixel or to the given group of pixels. Each displacement field can include e.g. a first value (290) indicative of a displacement to be applied according to an horizontal axis (X axis) and a second value (291) indicative of a displacement to be applied according to a vertical axis (Y axis). In the example of FIG. 2C, the displacement matrix is of size N*N and includes first values $290_{1,1}$ to $290_{N,N}$ and second values $291_{1,1}$ to $291_{N,N}$. In some embodiments, the displacement matrix 285 can be viewed as an optical flow matrix which describes optical flow between two images (in this case the corrected image 294 and the simulated image 292).

A training sample further includes at least one design image 286 of the specimen, generated based on design data. For example, the design image 286 can be simulated using CAD data (e.g. by rastering CAD data). A non-limitative example of a design image 286 is provided in FIG. 2D. The design image 286 includes second structural elements 287. The design image 286 is e.g. an image of a reference area of a specimen (e.g. die, cell, etc.), wherein the respective image data are verified to represent the reference area that is clear of defects.

Figure 2D:
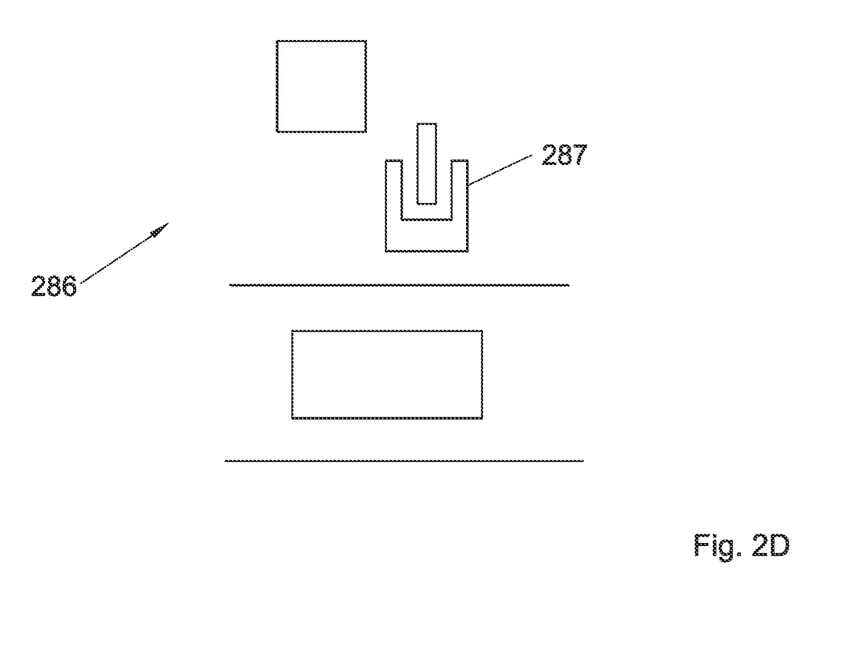
FIG. 2D illustrates a non-limitative example of a design image of the specimen of FIG. 2B.

The image 280 is comparable (e.g. die-to-database, etc.) with the design image 286 and is informative of a first area of a semiconductor specimen. The image 280 can be informative of a plurality of defects associated with the first area. The first area is configured to meet a similarity criterion with regard to the reference area and can belong to the same or to a different semiconductor specimen. The similarity criterion can define, for example, that the first area and the reference area correspond to the same physical components or to similar zones of the semiconductor specimen (e.g. similar dies, cells, etc.).

It is noted that, in order to ensure compatibility between the images, the image 280 (or the image from which the image 280 has been generated) and the design image 286 can undergo a registration procedure.

The method further includes (operation 205) training a machine learning module 212. The machine learning module 212 can correspond e.g. to DNN module 112.

For a given training sample of the plurality of training samples, which includes a given image 280 (a given displacement matrix 285 is initialized for the given image 280) and a given design image 286, the training can include minimizing a function 295 representative of a difference between a simulated image 292 generated by the machine learning module 212 based on the given design image 286, and a corrected image 294 corresponding to the given image 280 after correction of pixel position of the given image 280 in accordance with the given displacement matrix 285.

Minimizing the function includes optimizing parameters of the machine learning module and of the given displacement matrix. This function can be viewed as a loss function. It has to be noted that minimizing a loss function f is equivalent to maximizing the inverse 1/f of the loss function f.

In other words, for a given training sample, once the minimization process has converged, one or more parameters of the machine learning module and one or more parameters of the given displacement matrix of the given training sample are optimized (for each parameter, this can include adjusting the previous value of the parameter, or, if there was no previous value for the parameter, this can include determining a value for the parameter). The minimization process can be progressive until e.g. a convergence criterion is met (e.g. the loss function has a sufficiently low value).

As explained above, the parameters of the machine learning module 212 can include e.g. weighting and/or threshold values of DNN 112. Concerning the given displacement matrix, the parameters can include one or more of the displacement fields (see e.g. $(290_{1,1};291_{1,1})$ to $(290_{N,N};291_{N,N})$).

Optimizing parameters of the machine learning module (and of the displacement matrix) can rely on techniques such as feedforward/backpropagation methods and can rely on any optimizer (e.g. Stochastic Gradient Descent—SGD, ADAM, etc.—this is not limitative).

Various different functions can be used as loss functions 295 (cross-entropy, Mean-Square Error, hinge loss, etc.). Non limitative examples are provided hereinafter. According to some embodiments, a loss function 295 includes the following terms:

$$LF = f\left(\sum_{X,Y}(P_{292}(X,Y) - P_{294}(X,Y))^2\right) \quad \text{Equation 1}$$

In Equation 1, LF is the loss function 295, $P_{292}(X,Y)$ corresponds to the value associated with the pixel located at position X,Y in the simulated image 292, $P_{294}(X,Y)$ corresponds to the value associated with the pixel located at position X,Y in the corrected image 294, and f corresponds to a predetermined function (which can include e.g. a logarithmic function "log", mean function, etc.).

Other equations can be used, as shown below:

$$LF = f\left(\sqrt{\sum_{X,Y}(P_{292}(X,Y) - P_{294}(X,Y))^2}\right) \quad \text{Equation 1'}$$

$$LF = f\left(\sum_{X,Y}|P_{292}(X,Y) - P_{294}(X,Y)|\right) \quad \text{Equation 1''}$$

These examples of loss functions are however not limitative.

According to some embodiments, a smoothing term can be incorporated in the loss function 295. The smoothing term influences optimization of parameters of the displacement matrix 285 in the training phase. According to some embodiments, the smoothing term ensures that the DNN 112 characterizes a physical phenomenon (that has a "smooth" behavior) and does not over fit noise present in the images. In some embodiments, the smoothing term can be similar to a smoothing term present in optical flow correction between two images.

According to some embodiments, the following smooth term $\mathcal{L}_{smooth}$ can be used in the loss function 295 (this term is not limitative and other terms can be used):

$$\mathcal{L}_{smooth} = \int\int\left(\frac{\partial^2 U}{\partial x^2}\right)^2 + \left(\frac{\partial^2 U}{\partial y^2}\right)^2 + \quad \text{Equation 2}$$

$$2\left(\frac{\partial^2 U}{\partial x \partial y}\right)^2 dxdy + \int\int\left(\frac{\partial^2 V}{\partial x^2}\right)^2 + \left(\frac{\partial^2 V}{\partial y^2}\right)^2 + 2\left(\frac{\partial^2 V}{\partial x \partial y}\right)^2 dxdy$$

As explained above, each given pixel located at position (x,y) in the image 280 is associated with a displacement field (U(x,y);V(x,y)), wherein U corresponds to a pixel displacement according to an horizontal axis (X axis) and V corresponds to a pixel displacement according to a vertical axis (Y axis).

Figure 2E:
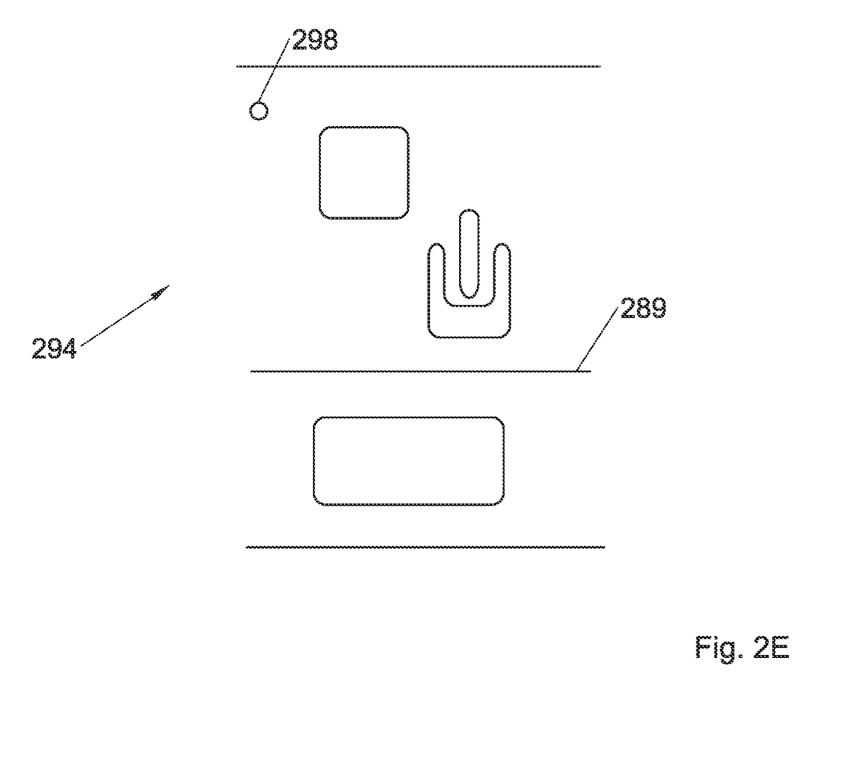
FIG. 2E illustrates a non-limitative example of a corrected image obtained after correction of the image according to the displacement matrix.

FIG. 2E illustrates a corrected image 294 corresponding to the given image 280 after correction of pixel position of the given image 280 in accordance with the given displacement matrix 285 (final parameters of the given displacement matrix 285 are obtained after completion of the optimization process using the loss function 295). As shown, the corrected image 294 is particular in that a contour of the structural elements is smoother, with less process variation (which causes, in particular, irregularities of the contour of the structural elements). This is visible by comparing e.g. line 289 of the corrected image 294 and corresponding line 281 of the image 280. Application of the displacement matrix 285 to the image 280 thus led to reduction of process variation in the corrected image 294. However, the corrected image 294 still includes other structural defects that were present in the image 280 (see e.g. defect 298).

As shown in FIG. 2, the training can be repeated for another training sample (see operation 206), which also includes a given image and a given design image. A given displacement matrix (including e.g. initial values to be optimized) is initialized for the given image.

At each iteration of the training process, one or more parameters of the machine learning module 212 (which is common for all training samples) can be adjusted. In addition, at each iteration, parameters of the displacement matrix (which is specific to each training sample) are generated. Lastly, at each iteration of the training process, a corrected image and a simulated image are obtained for a given training sample. The simulated image looks similar to the image, but without random artifacts (noise/defects).

Figure 3:
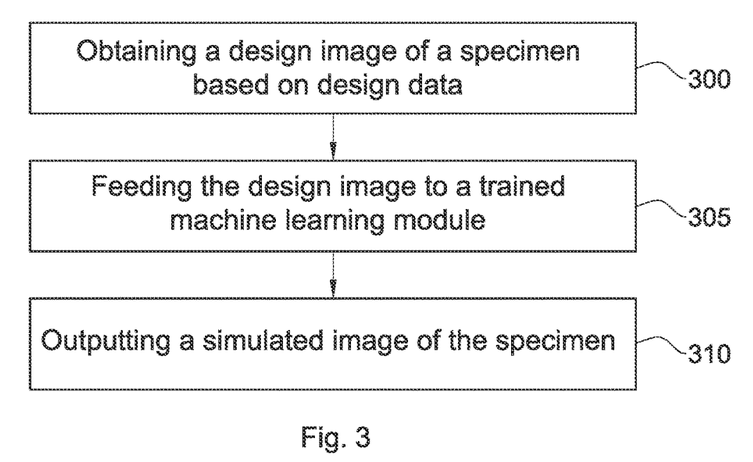
FIG. 3 illustrates a generalized flow-chart of a method of generating a simulated image, during an examination phase.
Figure 3A:
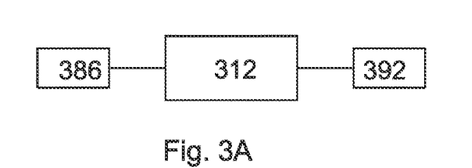
FIG. 3A illustrates an architecture that can be used to perform the method of FIG. 3.

Attention is now drawn to FIG. 3 and FIG. 3A.

Assume that a trained machine learning module 312 has been obtained using e.g. the various training methods described above. The machine learning module 312 corresponds e.g. to the machine learning module 212 after its training is performed, based on one or more training samples.

During a prediction phase (e.g. during run-time examination of a specimen), a method can include obtaining (operation 300) a design image 386 of a specimen, generated based on design data. The design image 386 can be associated with a specimen which is different from a specimen for which a design image 285 and an image 286 have been obtained in the training phase. In other words, the machine learning module 312 is not necessarily used on the same specimen which was the specimen(s) used for its training.

Based on the design image 386, it is desired to generate a simulated image 392 of the specimen.

The method includes feeding (operation 305) the design image 386 to the trained machine learning module 312, which in turns outputs (operation 310) the simulated image 392. The simulated image 392 is similar to an image of the specimen (which would have been obtained if an image of the specimen had been acquired using an examination tool 101 or 102), but in which noise and/or defects have been reduced or cancelled (e.g. noise, defects, process variation, color variation, charging, or any other random artifacts. etc.). In other words, it is possible to use the machine learning module 312 to predict, for a given specimen, based on a design image (e.g. CAD image) of the given specimen, an image of the given specimen without random artifacts.

Simulated image 392 can be used for various purposes, such as (but not limited) CAD to SEM registration (alignment between a SEM image and an image derived from CAD data—in this case the simulated image 392), CAD based segmentation (segmenting/partitioning a SEM image to homogenous regions based on a CAD image—in this case the simulated image 392), and CAD based detection (also called single image detection, which includes in this case using the simulated image 392 as a reference for detection).

Figure 3B:
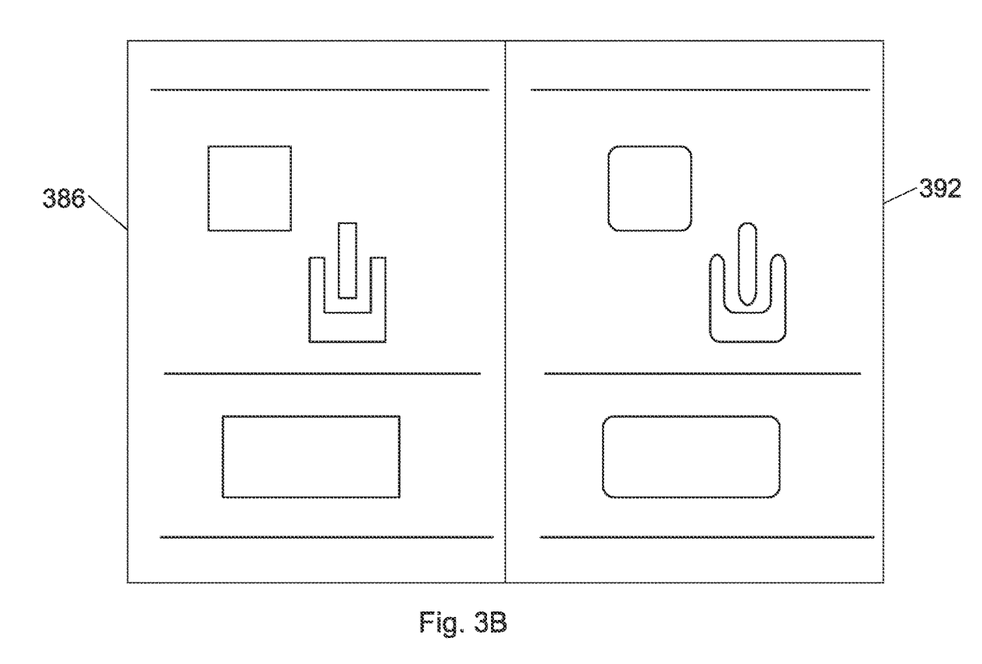
FIG. 3B illustrates a comparison between an input and an output of the method of FIG. 3.

FIG. 3B shows a comparison between the design image 386 and the simulated image 392 for a given specimen under examination.

Figure 4:
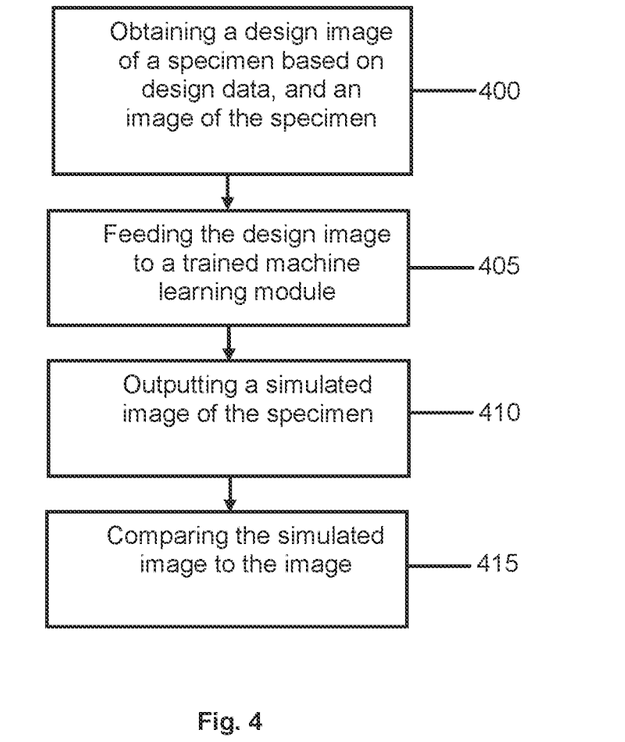
FIG. 4 illustrates a generalized flow-chart of a method of verifying training of the machine learning module.

According to some embodiments, once the machine learning module has been trained, a validation method of the trained machine learning module can be performed, as described with reference to FIG. 4. According to some embodiments, the validation process includes obtaining (operation 400) a design image of a specimen based on design data (see e.g. design image 286, 386) and a real image of the specimen (e.g. a real SEM image of the specimen). The method further includes feeding (operation 405) the design image to the trained machine learning module. The trained machine learning module outputs a simulated image (operation 410). The simulated image is then compared to the image (operation 415) in order to verify that the simulated image is similar to the image but without (or at least with less) noise and/or defects. This comparison can be performed manually (e.g. by an operator) and/or by a computerized method (e.g. image processing methods allowing comparison of images). The comparison indicates whether the training machine learning module has been sufficiently trained or should be further trained (e.g. using additional training samples).

Figure 5:
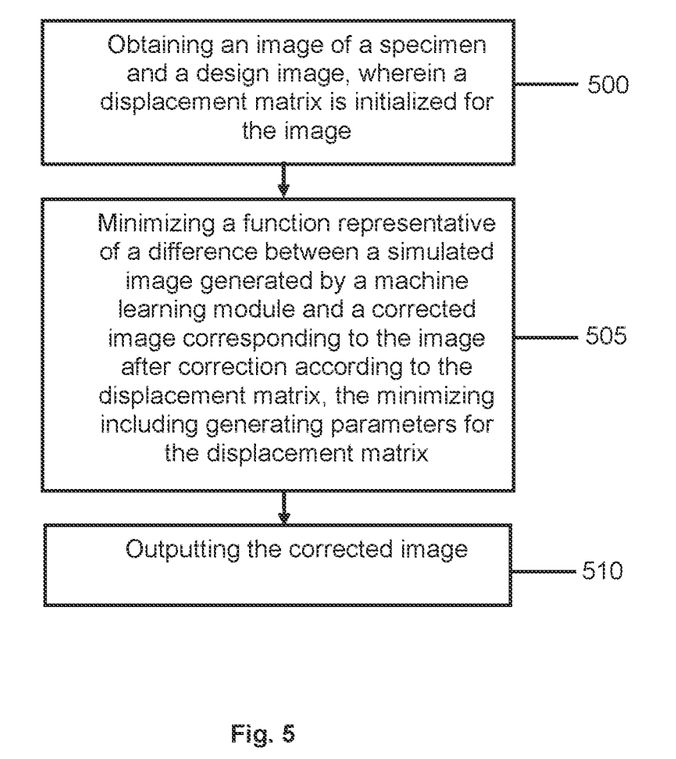
FIG. 5 illustrates a generalized flow-chart of a method of generating a corrected image based on an image and a design image.
Figure 5A:
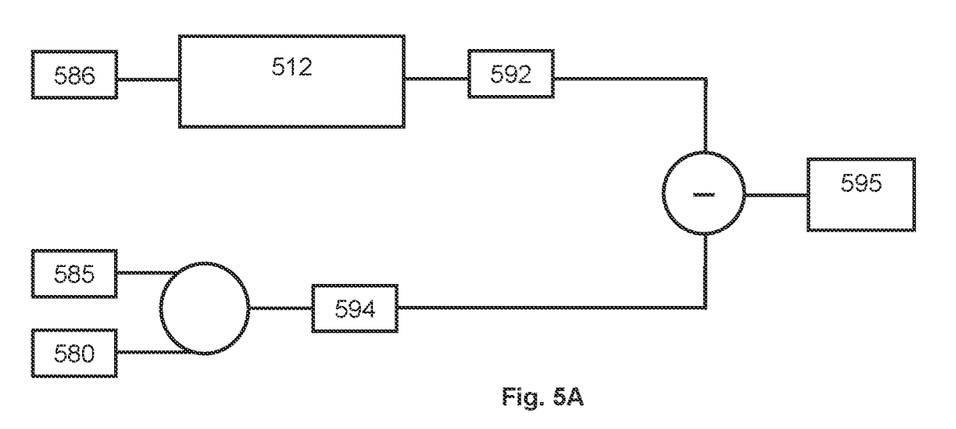
FIG. 5A illustrates an architecture that can be used to perform the method of FIG. 5.

Attention is now drawn to FIGS. 5 and 5A.

The method of FIGS. 5 and 5A can be e.g. performed during an examination phase (run-time) of a specimen.

A method includes obtaining (operation 500) an image 580 of a semiconductor specimen (similar to image 280) and a design image 586 (similar to design image 286) of the specimen, generated based on design data. A displacement matrix 585 (similar to displacement matrix 285) is initialized for the image 580.

Assume that a machine learning module 512 is available (similar to machine learning module 212) and has been trained, at least partially, based on one or more training samples, as explained above.

The method includes minimizing (operation 505) a function (loss function) representative of a difference between a simulated image 592 generated by the machine learning module 512 based on the design image 586, and a corrected image 594 corresponding to the image 580 after correction of pixel position of the image 580 in accordance with the displacement matrix 585, wherein the minimizing includes generating parameters for the displacement matrix 585.

The function (referred to as 595) can be similar to the function 295 described above. Although the minimization process is similar to operation 205, in this method, when function 595 is minimized, the parameters of the machine learning module 512 are not optimized, and only parameters of the displacement matrix 585 are optimized. As explained above, at operation 205, both the parameters of the machine learning module 212 and the parameters of the displacement matrix 285 were optimized when minimizing loss function 295.

Once the loss function 595 has been minimized and the parameters of the displacement matrix 585 have been optimized, a corrected image 594 (corresponding to the image 580 corrected according to the displacement matrix 585 including optimized parameters) is obtained.

The method includes outputting (operation 510) the corrected image 594. As already explained above, the corrected image 594 is particular in that a contour of the structural elements present in the image is smoother, with less process variation (which causes, in particular, irregularities of the contour of the structural elements).

The corrected image 594 can be used together with the simulated image 592 for various purposes, such as (but not limited to) CAD to SEM registration (registration between the simulated image 592 and the corrected image 594), CAD based segmentation (segmentation of the corrected image 594 based on the simulated image 592) and CAD based detection (detection of defects in the corrected image 594 based on the simulated image 592 used as a reference). Since the corrected image 594 comprises less process variation than the raw image 580, it can be used in a more sensitive manner in these applications than the raw image 580.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system comprising one or more processing circuitries configured to:
   obtain a design image of a semiconductor specimen generated based on design data, wherein the design image is informative of a plurality of elements, and
   feed the design image, or data informative thereof, to a trained machine learning model, to generate a simulated image informative of the plurality of elements of the semiconductor specimen, wherein the simulated image corresponds to an estimation of an inspection image of the semiconductor specimen which would have been acquired by an examination tool, wherein the simulated image comprises less defects than the inspection image, and wherein one or more corners of a contour of each given element of some or all of the plurality of elements has an appearance in the simulated image which better match an appearance of said one or more corners of the contour of the given element in the inspection image than an appearance of said one or more corners of the contour of the given element in the design image.

2. The system of claim 1, wherein said appearance of the one or more corners correspond to a curvature of the one or more corners.

3. The system of claim 1, wherein said less defects include at least one of: less structural defects, less noise, less process variation, less color variation, less charging effect, or less random artifacts.

4. The system of claim 1, configured to use the simulated image for at least one of (i) or (ii) or (iii):
   (i) image registration between an image of the semiconductor specimen and the simulated image, or
   (ii) segmenting an image of the semiconductor specimen based on the simulated image, or
   (iii) using the simulated image as a reference image for defect detection.

5. The system of claim 1, wherein the machine learning model has been trained using operations comprising, for each given training image of a plurality of training images, generating a given corrected image corresponding to the given training image, wherein a contour of structural elements present in the given corrected image has less irregularities than a contour of said structural elements in the given training image.

6. The system of claim 1, wherein the machine learning model has been trained using operations including optimizing parameters of the machine learning model and values of a displacement matrix informative of displacement fields to be applied to pixels of a training image of a specimen fed to the machine learning model during its training.

7. The system of claim 1, wherein the machine learning model has been trained using operations comprising:
   obtaining a plurality of training samples, each given training sample comprising a given training image of a semiconductor specimen, and a given design image based on design data, wherein a given displacement matrix is associated with the given training image, and
   performing an optimization based on a function representative of a difference between:
     a simulated image generated by the machine learning model based on the given design image, and
     a corrected image corresponding to the given training image after correction of pixel position of the given training image in accordance with the given displacement matrix,
   wherein the optimization includes optimizing parameters of the machine learning model and values of the given displacement matrix,
   wherein the machine learning model is usable, after the training, to generate a simulated image of a semiconductor specimen based on a design image of the semiconductor specimen.

8. The system of claim 7, wherein the function comprises a smoothing term influencing optimization of values of the given displacement matrix.

9. The system of claim 1, wherein the machine learning model has been trained using operations including obtaining a design image of a semiconductor specimen based on design data and an image of the specimen acquired by an examination tool, feeding the design image to the machine learning model to generate a simulated image, comparing the simulated image to the image in order to verify that the simulated image corresponds to the image with less noise or with less defects than in the image.

10. A method comprising, by one or more processing circuitries:
    obtaining a design image of a semiconductor specimen generated based on design data, wherein the design image is informative of a plurality of elements, and
    feeding the design image, or data informative thereof, to a trained machine learning model, to generate a simulated image informative of the plurality of elements of the semiconductor specimen, wherein the simulated image corresponds to an estimation of an inspection image of the semiconductor specimen which would have been acquired by an examination tool, wherein the simulated image comprises less defects than the inspection image, and wherein one or more corners of a contour of each given element of some or all of the plurality of elements has an appearance in the simulated image which better match an appearance of said one or more corners of the contour of the given element in the inspection image than an appearance of said one or more corners of the contour of the given element in the design image, obtaining a first image of a semiconductor specimen acquired by an examination tool and a first design image based on design data, feeding the first design image to a machine learning model, using an output of the machine learning model to generate a corrected image corresponding to the first image after correction of pixel position of the first image, wherein a contour of structural elements present in the corrected image has less irregularities than a contour of said structural elements in the first image, and using the corrected image for at least one of (i), (ii) or (iii):
    (i) image registration;
    (ii) image segmentation;
    (iii) defect detection.

11. The method of claim 10, wherein said appearance of the one or more corners correspond to a curvature of the one or more corners, comprising using the output of the machine learning model to determine values of a first displacement matrix associated with the first image, and generating the corrected image corresponding to the first image after correction of pixel position of the first image in accordance with the first displacement matrix, wherein a contour of structural elements present in the corrected image has less irregularities than a contour of said structural elements in the first image.

12. The method of claim 11, wherein said less defects include at least one of: less structural defects, less noise, less process variation, less color variation, less charging effect, or less random artifacts.

13. The method of claim 10, comprising using the simulated image for at least one of (i) or (ii) or (iii):
(i) image registration between an image of the semiconductor specimen and the simulated image, or
(ii) segmenting an image of the semiconductor specimen based on the simulated image, or
(iii) using the simulated image as a reference image for defect detection.

14. The method of claim 10, wherein at least one of (i) or (ii) is met: wherein the machine learning model has been trained using operations comprising, for each given training image of a plurality of training images, generating a given corrected image corresponding to the given training image, wherein a contour of structural elements present in the given corrected image has less irregularities than a contour of said structural elements in the given training image,
(i) the corrected image includes structural defects present in the first image but comprises less irregularities in a contour of the structural elements than the first image, or
(ii) one or more corners of a contour of each given element of a plurality of elements of the specimen has an appearance in the corrected image which better match an appearance of said one or more corners of the contour of the given element in the first image than an appearance of said one or more corners of the contour of the given element in the first design image.

15. The method of claim 10, wherein the machine learning model has been trained using operations including optimizing parameters of the machine learning model and values of a displacement matrix informative of displacement fields to be applied to pixels of a training image of a specimen fed to the machine learning model during its training, comprising optimizing values of the first displacement matrix using a function representative of a difference between: a simulated image generated by the machine learning model based on the first design image, and a corrected image corresponding to the first image after correction of pixel position of the first image in accordance with the first displacement matrix.

16. The method of claim 15, wherein the machine learning model has been trained using operations comprising: obtaining a plurality of training samples, each given training sample comprising a given training image of a semiconductor specimen, and a given design image based on design data, wherein a given displacement matrix is associated with the given training image, and performing an optimization based on a function representative of a difference between: a simulated image generated by the machine learning model based on the given design image, and a corrected image corresponding to the given training image after correction of pixel position of the given training image in accordance with the given displacement matrix, wherein the optimization includes optimizing parameters of the machine learning model and values of the given displacement matrix, wherein the machine learning model is usable, after the training, to generate a simulated image of a semiconductor specimen based on a design image of the semiconductor specimen.

17. The method of claim 16, wherein the function comprises a smoothing term influencing optimization of values of the given displacement matrix.

18. The method of claim 10, performed during run-time examination of the semiconductor specimen by the examination tool.

19. The method of claim 10, wherein the machine learning model has been trained using operations comprising: obtaining a design image of a semiconductor specimen based on design data and an image of the specimen acquired by an examination tool, feeding the design image to the machine learning model to generate a simulated image, comparing the simulated image to the image in order to verify that the simulated image corresponds to the image with less noise or with less defects than in the image.

20. A non-transitory computer readable medium comprising instructions that, when executed by one or more processing circuitries, cause the one or more processing circuitries to perform operations comprising (i) or (ii):
(i) obtaining a design image of a semiconductor specimen generated based on design data, and feeding the design image, or data informative thereof, to a trained machine learning model, to generate a simulated image of the semiconductor specimen, wherein the simulated image corresponds to an estimation of an inspection image of the semiconductor specimen which would have been acquired by an examination tool, wherein the simulated image comprises less defects than the inspection image, and wherein one or more corners of a contour of each given element of some or all of the plurality of elements has an appearance in the simulated image which better match an appearance of said one or more corners of the contour of the given element in the inspection image than an appearance of said one or more corners of the contour of the given element in the design image, or
(ii) obtaining a first image of a semiconductor specimen acquired by an examination tool and a first design image based on design data, feeding the first design image to a machine learning model, and using an output of the machine learning model to generate a corrected image corresponding to the first image after correction of pixel position of the first image, wherein a contour of structural elements present in the corrected image has less irregularities than a contour of said structural elements in the first image.

* * * * *